Oct. 26, 1926.

R. MINCHIN 1,604,131

TOASTING APPARATUS

Filed July 31, 1925

INVENTOR
RICHARD MINCHIN
BY Richards & Geier

ATTORNEYS

Patented Oct. 26, 1926.

1,604,131

UNITED STATES PATENT OFFICE.

RICHARD MINCHIN, OF PERTH, AUSTRALIA.

TOASTING APPARATUS.

Application filed July 31, 1925. Serial No. 47,195.

This invention relates to toasting apparatus.

Considerable difficulty is experienced in hotels and restaurants in satisfying the demand for toasted bread and muffins.

Although automatic toasting apparatus has been devised, the means hitherto employed for supporting the material being toasted have not been entirely satisfactory. The present invention particularly concerns improvements for supporting the slices of bread or muffins while they are being moved past a source of radiant heat.

The invention will, however, be more readily understood by reference to the accompanying drawing, showing a suitable form of toasting apparatus having the improvements embodied therein.

In the drawing:—

Figure 1:
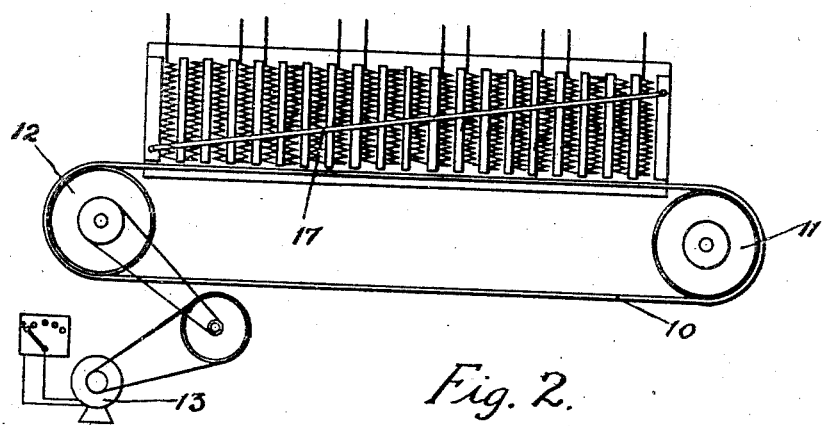
Fig. 1 is a side elevation of the material parts of the toasting apparatus from which the source of electrical heat on the near side has been removed:—
Figure 2:
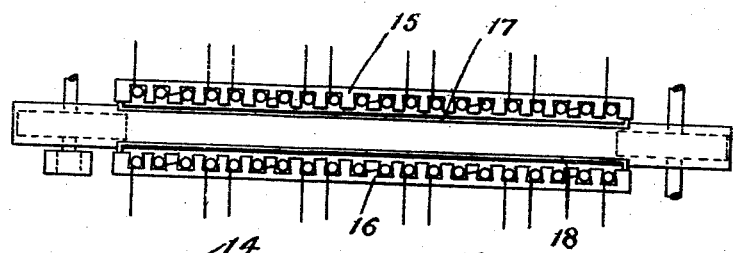
Fig. 2 is a plan of material parts of the apparatus, and:—
Figure 3:
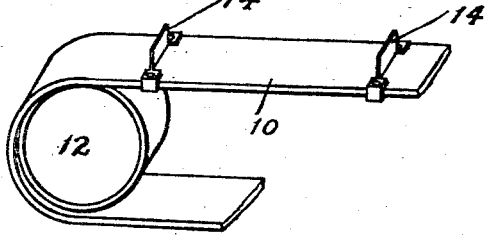
Fig. 3 is a perspective view of portion of the metal belt showing how stops can be attached.

In the drawings 10 shows an endless thin metal belt supported on pulleys 11 and 12. One pulley such as 12 is driven by an electric motor 13 provided with reduction gearing and means for speed regulation. The belt 10 is made wider than the pulleys so that if necessary clips 14 can be attached to the overlapping edges thereof.

In juxtaposition to one side of the upper part of the belt is an insulating and supporting block 15 that commences at about the level of such belt and extends upwardly. In the block 15 is supported electrical resistance wire such as nichrome wire, for the purpose of serving as a source of radiant electrical heat. The resistance wire will be wound in or on the block in a manner most suitable having regard to the conditions under which the current is available. The arrangement shown in the drawings provides for a plurality of heating elements, which may frequently be convenient. On the other side is a similar block 16 also wound with, or supporting, resistance wire. An inclined guard rail 17 prevents material travelling on the belt from falling against the block 15, whilst another guard rail 18, preferably inclined in the opposite direction, prevents material falling against the block 16. The guard rails 17 and 18, while supporting the material being toasted, will yet, by reason of their inclination, permit the whole surface to be toasted.

The apparatus operates as follows:—

Current is passed through the resistance elements so as to provide radiant heat and the belt 10 is caused to travel by starting up the motor 13. Slices of bread or other material to be toasted are placed on the belt at one end of the apparatus and travel through the toasting zone. Should the material emerge from such zone insufficiently toasted, it is necessary to slow down the motor until the correct conditions are attained. Untoasted material can then be periodically fed on to one end of the belt and toasted material periodically removed from the other end thereof. When dealing with material liable to roll (such as muffins) clips such as 14 (or larger) can be fixed on the belt to prohibit such tendency.

Although reference has been made to a thin metal belt, it is obvious that such belt need not be in one piece. Obviously the belt can be built up of a number of articulated sections.

I claim:

1. In a toasting apparatus, a conveyor for carrying the bread to be toasted, a heating unit past which said conveyor moves, and a guard rail engageable by the bread being toasted, said rail extending the length of said unit to prevent contact of the bread therewith and arranged in an inclined position relative to the supporting surface of said conveyor so that the portion of the bread engaging said guard rail will be constantly changed as the conveyor moves past said unit.

2. In a toasting apparatus, an endless conveyor for supporting the bread to be toasted, heating units arranged on opposite sides of said conveyor and past which the bread is moved by said conveyor, and guard rails each carried by one of said units and preventing contact of the bread with said units, said rails being inclined in opposite directions relative to each other and to the supporting surface of said conveyor.

Dated this tenth day of June, 1925.

RICHARD MINCHIN.